United States Patent
Akimoto et al.

(10) Patent No.: US 7,401,830 B2
(45) Date of Patent: Jul. 22, 2008

(54) AUTOMOTIVE CONSOLE ASSEMBLY WITH TUBULAR FRAME

(75) Inventors: Yukio Akimoto, Dublin, OH (US); Matt Parkinson, Ann Arbor, MI (US); John Hwang, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/609,479

(22) Filed: Dec. 12, 2006

(65) Prior Publication Data
US 2007/0138819 A1   Jun. 21, 2007

Related U.S. Application Data

(60) Provisional application No. 60/752,110, filed on Dec. 20, 2005.

(51) Int. Cl.
*B60R 7/04* (2006.01)

(52) U.S. Cl. .................... 296/24.34; 296/37.8
(58) Field of Classification Search .......... 296/24.34, 296/37.8; 224/275, 282, 483
See application file for complete search history.

(56) References Cited

U.S. PATENT DOCUMENTS

| | | | | |
|---|---|---|---|---|
| 5,085,491 | A | * | 2/1992 | Lautenschlager .......... 296/37.8 |
| 5,338,081 | A | * | 8/1994 | Young et al. ............. 296/37.14 |
| 5,390,976 | A | * | 2/1995 | Doughty et al. ............. 297/115 |
| 5,964,490 | A | | 10/1999 | Schroeder et al. |
| 6,059,238 | A | | 5/2000 | Reynolds et al. |
| 6,129,400 | A | * | 10/2000 | Jakubiec et al. .......... 296/37.14 |
| 6,231,098 | B1 | * | 5/2001 | Schenk et al. ............. 296/37.8 |
| 6,382,726 | B2 | | 5/2002 | Bullesbach et al. |
| 6,435,587 | B1 | * | 8/2002 | Flowerday et al. ......... 296/37.8 |
| 6,513,877 | B1 | | 2/2003 | Ikeda et al. |
| 7,004,526 | B2 | * | 2/2006 | Herbold et al. .......... 296/24.34 |
| 7,165,808 | B2 | * | 1/2007 | Harland et al. ......... 297/188.01 |
| 7,175,203 | B2 | * | 2/2007 | Scheib ....................... 280/781 |
| 7,185,937 | B2 | * | 3/2007 | Sakakibara ................ 296/37.8 |
| 7,237,816 | B1 | * | 7/2007 | Singh et al. ............. 296/24.34 |
| 2005/0035618 | A1 | * | 2/2005 | Toth et al. ................ 296/24.34 |
| 2006/0113811 | A1 | * | 6/2006 | Tanaka et al. ............ 296/24.34 |

* cited by examiner

*Primary Examiner*—Dennis H. Pedder
*Assistant Examiner*—Mike Hernandez
(74) *Attorney, Agent, or Firm*—Mark E. Duell, Esq.; Emerson, Thomson & Bennett (57) ABSTRACT

An automobile may include a vehicle frame, a body supported on the vehicle frame and defining a passenger compartment and a console assembly positioned within the passenger compartment. The console assembly may include: (A) a console frame having at least a first tubular portion and a plurality of legs where each leg is supported on the vehicle frame; (B) an outer shell connected to the console frame for use in covering the console frame; and, (C) an armrest supported on the console frame and adapted to support a person's arm.

20 Claims, 14 Drawing Sheets

FIG-14

AUTOMOTIVE CONSOLE ASSEMBLY WITH TUBULAR FRAME

This application claims priority to U.S. Ser. No. 60/752,110, entitled AUTOMOTIVE CONSOLE ASSEMBLY WITH A TUBULAR FRAME, filed Dec. 20, 2005, which is incorporated herein by reference.

I. BACKGROUND OF THE INVENTION

A. Field of Invention

This invention pertains to the art of methods and apparatuses for automobile consoles, and more specifically to an automobile console having a console frame formed of one or more tubular members.

B. Description of the Related Art

It is well known in the automotive industry to provide a vehicle with a console positioned between two seats. These known consoles either have no rigid frame structure or include a frame structure formed of flat steel stampings or castings. An example of such a frame structure is provided in U.S. Pat. No. 5,390,976 to Doughty et al.

While many known console frame structures work well for their intended purpose, consoles continue to get larger and taller and often are used as armrests. These factors may tend to increase the forces exerted on console frame structures. The console assembly of this invention overcomes these difficulties and provides a console frame with sufficient strength and rigidity to withstand these forces.

II. SUMMARY OF THE INVENTION

According to one aspect of this invention, a vehicle may include: (1) a vehicle frame; (2) a body supported on the vehicle frame and defining a passenger compartment; and, (3) a console assembly positioned within the passenger compartment. The console assembly may include: (1) a console frame having at least a first tubular portion and a plurality of legs where each leg is supported on the vehicle frame; (2) an outer shell connected to the console frame for use in covering the console frame; and, (3) an armrest supported on the console frame and adapted to support a person's arm.

According to another aspect of this invention, the armrest may be pivotally attached to the console frame.

According to still another aspect of this invention, a latch mechanism may be provided for use in latching the armrest to a latch panel.

According to another aspect of this invention, a console container may be provided for use in storing miscellaneous items.

According to another aspect of this invention, each of the legs of the console frame may be formed of a tubular portion.

According to another aspect of this invention, the console frame may include a plate supported by the legs used to support vehicle components.

According to another aspect of this invention, the console frame may have a pair of tiers.

According to still another aspect of this invention, a console assembly may be adapted to be attached within the passenger compartment of a vehicle having a vehicle frame. The console assembly may include: (1) a console frame having a plurality of legs where each leg is formed of a tubular portion and is supported on the vehicle frame; (2) an outer shell connected to the console frame for use in covering the console frame; (3) an armrest pivotally supported on the console frame and adapted to support a person's arm; and, (4) a console container supported on the console frame where the console container is adapted to store miscellaneous items and is accessible through the armrest.

According to another aspect of this invention, the tubular members may be bent into a predetermined configuration before they are assembled into the console frame.

One advantage of this invention is that the console assembly includes a strong and durable console frame that can withstand the bending and twisting loads that may be applied to it.

Another advantage of this invention is that the console assembly can be easily and economically constructed.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
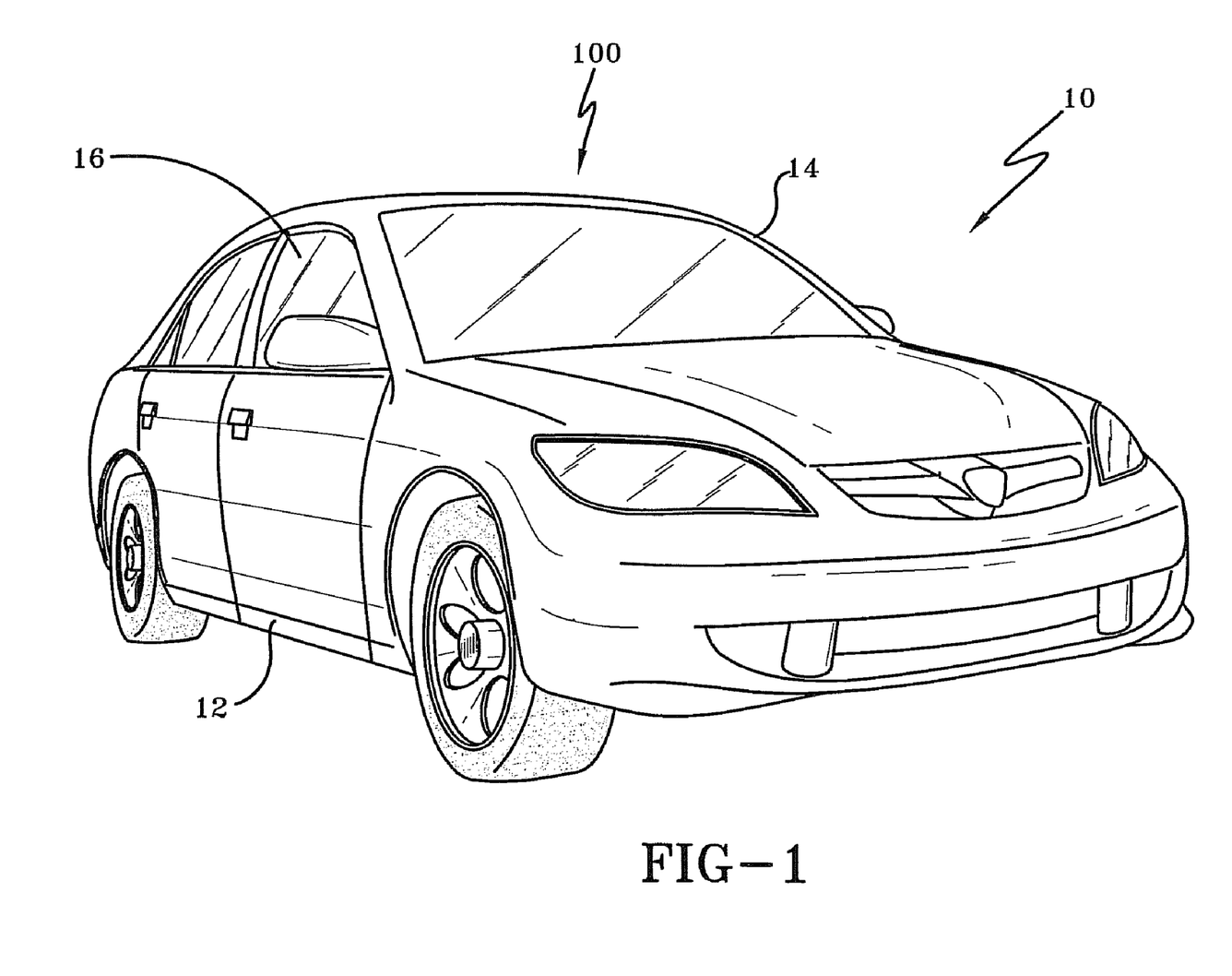
FIG. 1 is a perspective view of an automobile equipped with a console assembly according to this invention.

Referring now to the drawings wherein the showings are for purposes of illustrating a embodiments of the invention only and not for purposes of limiting the same, FIG. 1 shows an automobile 10 equipped with the console assembly 100 of this invention. It should be noted that while a passenger vehicle 10 is shown, the console assembly 100 of this invention will work well with other vehicles and for other purposes as well. The automobile 10 shown includes a vehicle frame 12 and a body 14 that is supported on the frame 12. The body 14 defines a passenger compartment 16 which is equipped to receive one or more passengers as is well known in the art. The vehicle may also include a floorboard (shown with reference number 15 in FIG. 9) supported to the vehicle frame 12 in any conventional manner. The automobile 10 may also include all the conventional components of an automobile that are well known in the art such as those shown in U.S. Pat. No. 6,763,660 titled EXHAUST STRUCTURE IN ENGINE FOR AUTOMOBILE which has a common assignee and which is incorporated herein by reference.

Figure 2:
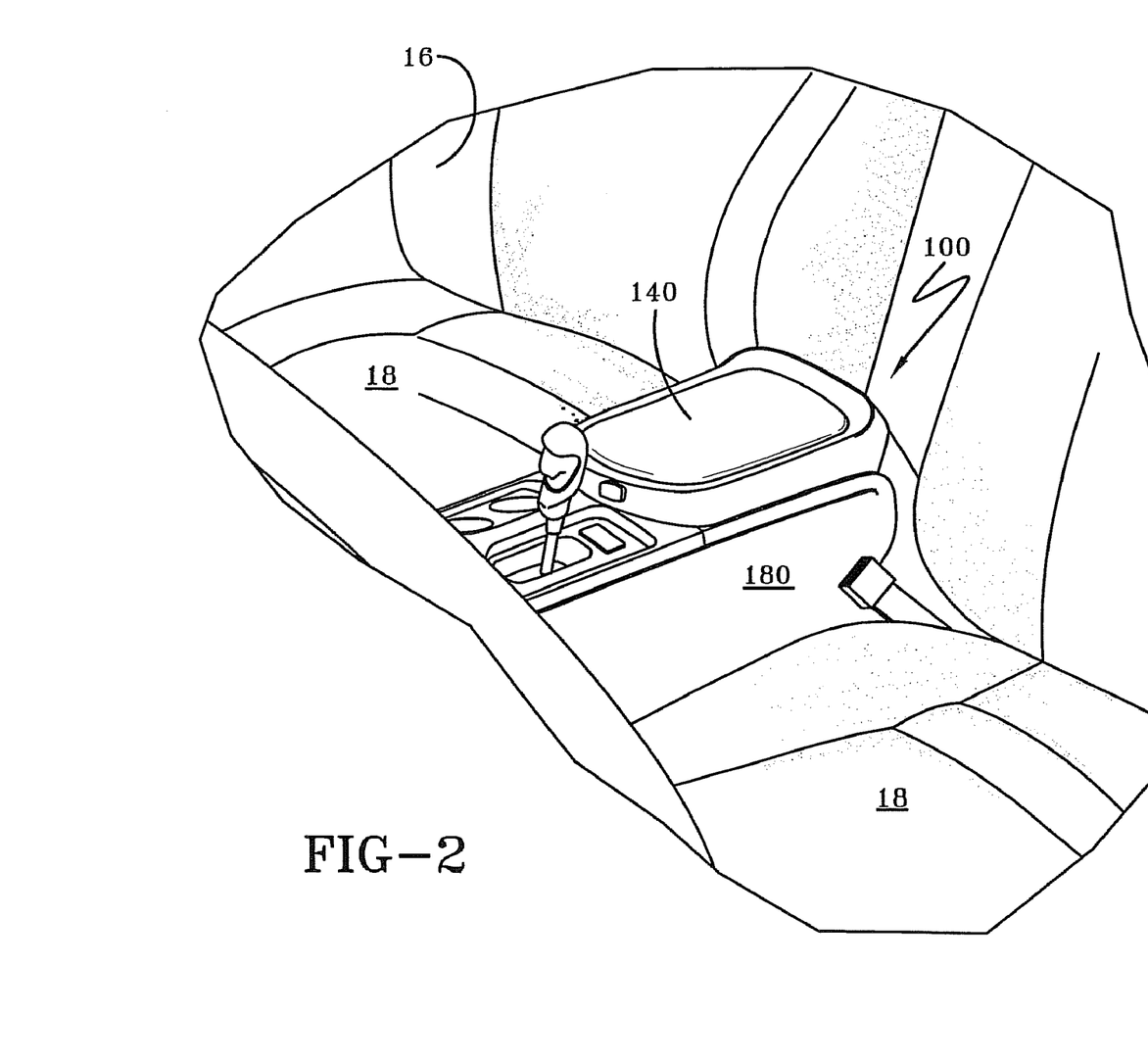
FIG. 2 is a perspective close up view of a portion of the passenger compartment of the vehicle shown in FIG. 1 showing the console assembly with the armrest in a closed condition.
Figure 3:
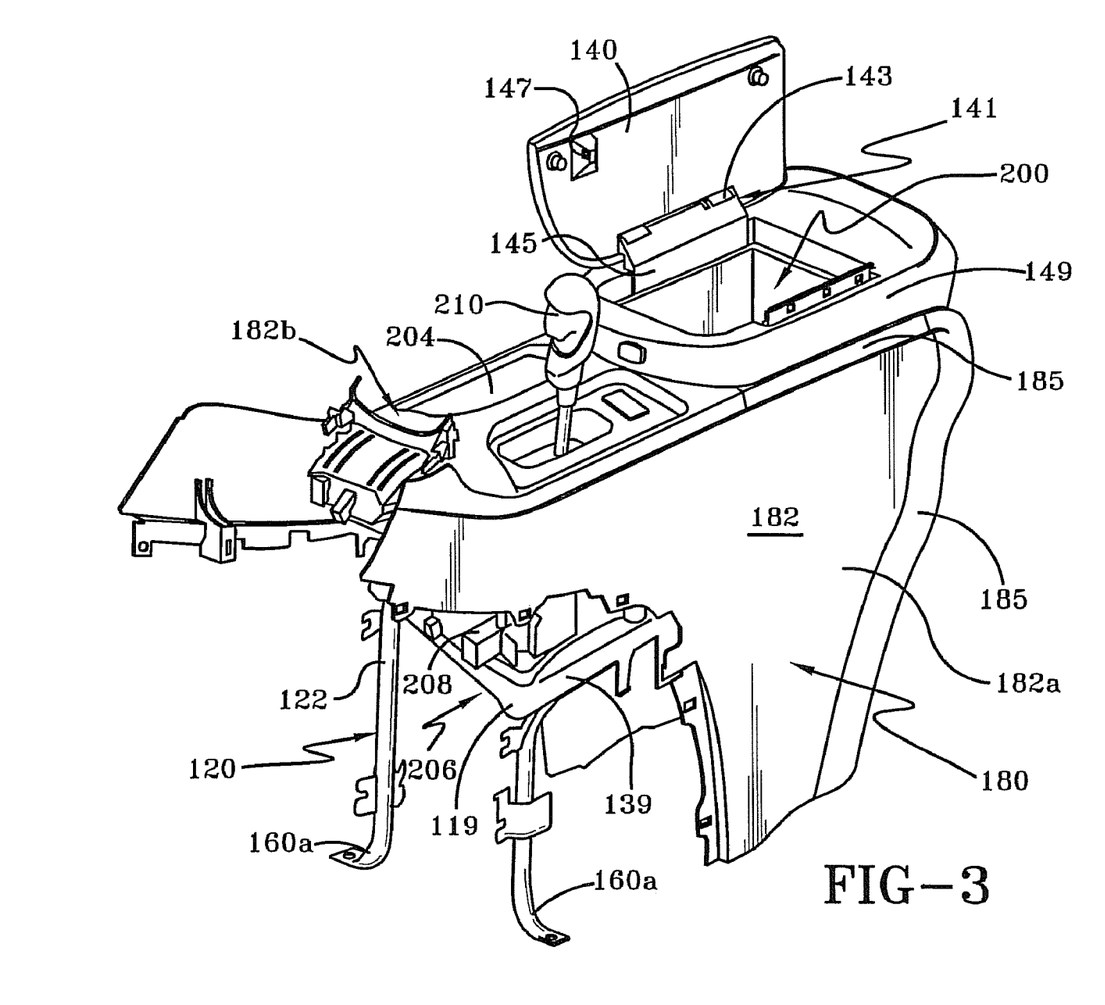
FIG. 3 is a perspective view of the console assembly shown in partial cut-away and showing the armrest in an opened condition.

With reference now to FIGS. 1-3, the console assembly 100 may be positioned between a pair of seats 18, 18 as shown. The seats 18, 18 are supported by the vehicle frame 12 and positioned within the passenger compartment 16 in any conventional manner. It should be noted that the console assembly 100 of this invention can be positioned in other areas, for example, in the back seat area or onto the inner surface of a vehicle door. The console assembly 100 may include a console frame 120, an outer shell 180 that is operatively connected to the console frame 120 for use in covering the console frame 120, and an armrest 140 supported on the console frame 120 and adapted to support a person's arm.

Figure 9:
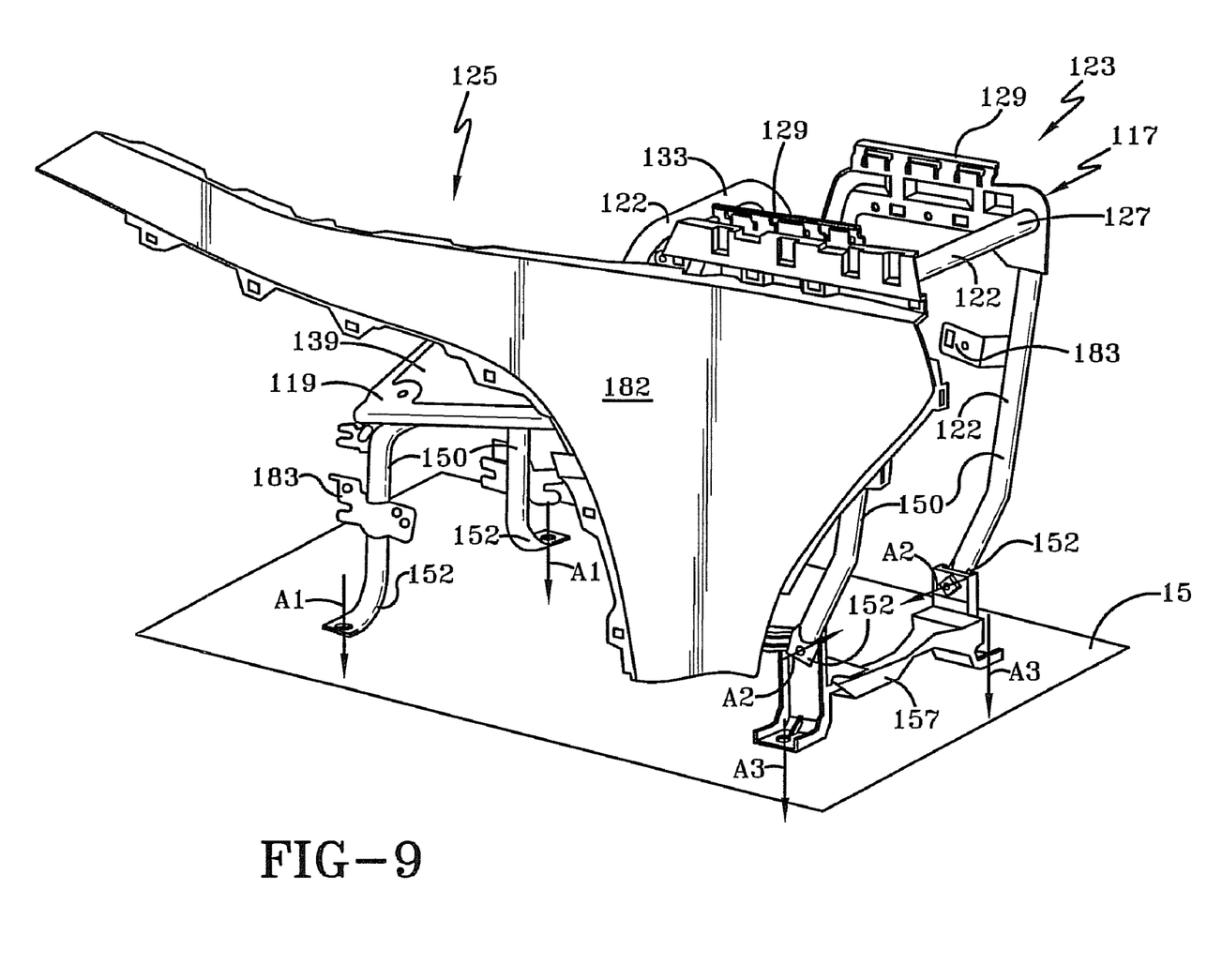
FIG. 9 is a perspective side view of the console frame illustrating how the console frame may be attached to the floorboard.

With reference now to FIGS. 3-9, the console frame 120 of this invention provides a rigid, strong, console support structure, believed to be unknown in the industry. The console frame 120 has first and second segments 123, 125 that, in the embodiment shown, define first and second tiers 117, 119 that are used in supporting components and passenger loads as described below. It should be noted, however, that any number of tiers, including only a single tier, will work well with this invention. The console frame 120 has a plurality of legs 150, four shown, that have first ends 152 which can be connected for support to the vehicle frame 12. In the embodiment shown as illustrated in FIG. 9, the first ends are supported to the floorboard 15. This connection to the floorboard 15 may be accomplished in any manner chosen with sound engineering judgment. In the embodiment shown, the pair of legs 150, 150 extending from the second segment 125 are directly connected to the floorboard 15 with bolts inserted through openings in the first ends 152, 152 as shown with arrows A1. The pair of legs 150, 150 extending from the first segment 123 are connected to a floor bracket 157 with bolts inserted through openings in the first ends 152, 152 as shown with arrows A2. The floor bracket 157 is then connected to the floorboard 15 with bolts inserted through openings in the floor bracket 157 as shown with arrows A3.

With continuing reference to FIGS. 3-9, in addition to two legs 150, 150, the first segment 123 of the console frame 120 may also include a first cross member 127 and a pair of frame brackets 129, 129. The second segment 125 of the console frame 120 may include a second cross member 133, a pair of side members 135, 135 as well as a pair of legs 150, 150, as shown. The second segment 125 may also include a plate 139 that extends across the side members 135, 135. The first and second cross members 127, 133 with the frame brackets 129, 129 define the first tier 117. The plate 139, mounted to the side members 135, 135 define the second tier 119. The first tier 117 may have a higher elevation than the second tier 119, as shown. These various components may be connected together into the form shown in any conventional manner but in the embodiment shown, are welded together.

Still referring to FIGS. 3-9, the increased stability and load bearing capabilities of the console frame 120 is improved with the use of at least one tubular member 122. By "tubular member" it is meant a device that is generally cylindrical with a hollow center. However, while the tubular members 122 shown have outer walls that form a circular cross-section, it is to be noted that the circular cross-section is not to be limiting as other cross-section shapes including oval and other curved cross-sections as well as triangle, square, rectangular, and other polygon shapes would also work with this invention. The tubular members 122 used to form the console frame 120 are preferably made out of metal although other structurally tubular shaped materials such as a rigid polymeric material could likewise be used. While not every component need be a tubular member, in the embodiment shown the console frame 120 is substantially tubular. By "substantially tubular" it is meant that the console frame 120 is formed primarily of one or more tubular members 122. In the embodiment shown, all four legs 150, the first and second cross members 127, 133 and the side members 135, 135 are all formed of tubular members.

Figure 4:
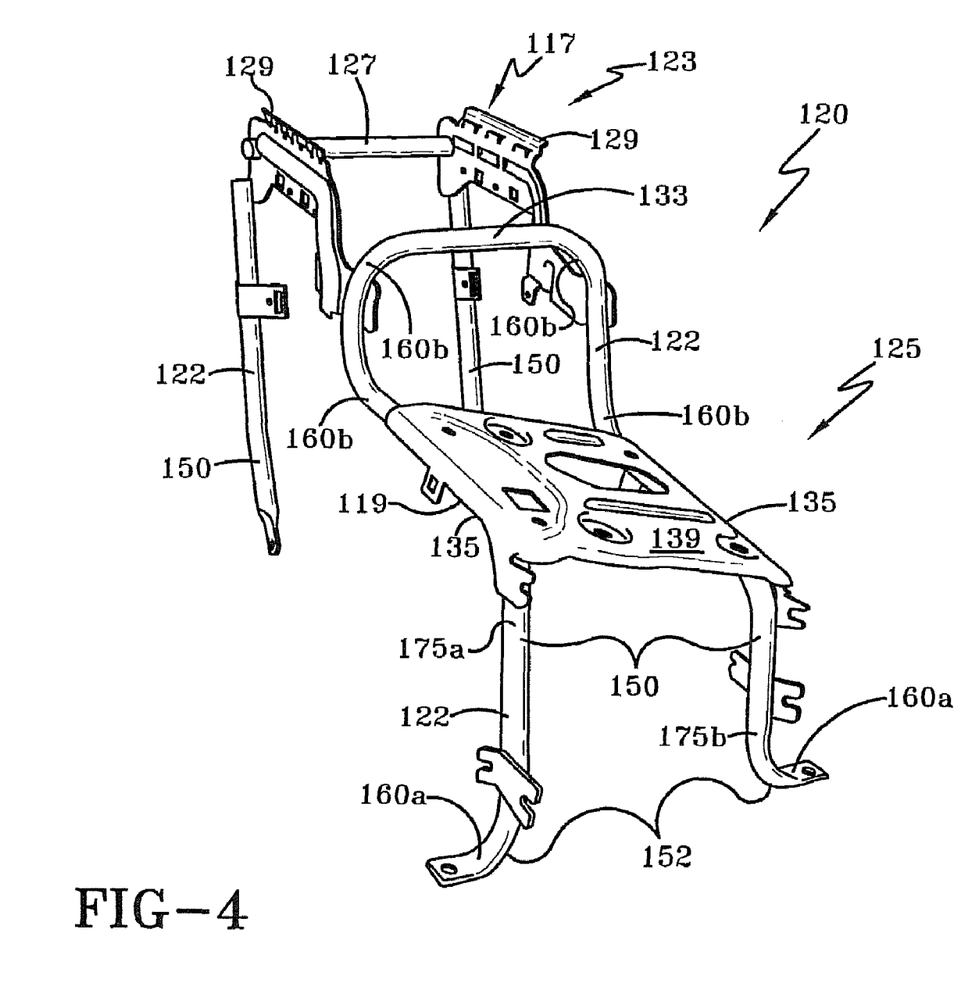
FIG. 4 is a perspective view of the console frame showing the tubular members used to assemble the console frame.
Figure 5:
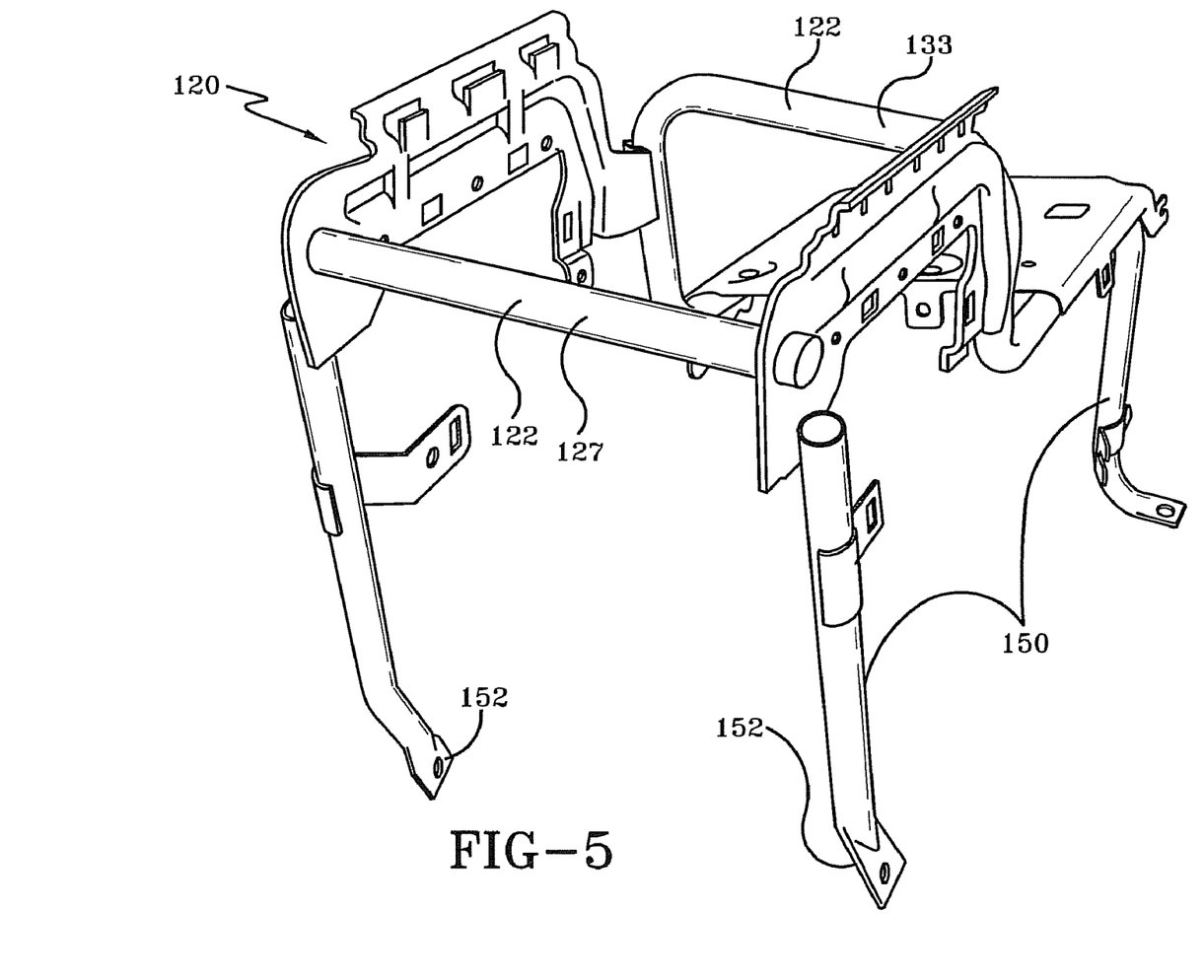
FIG. 5 is a perspective view of the console frame of FIG. 4 but from the opposite end.
Figure 6:
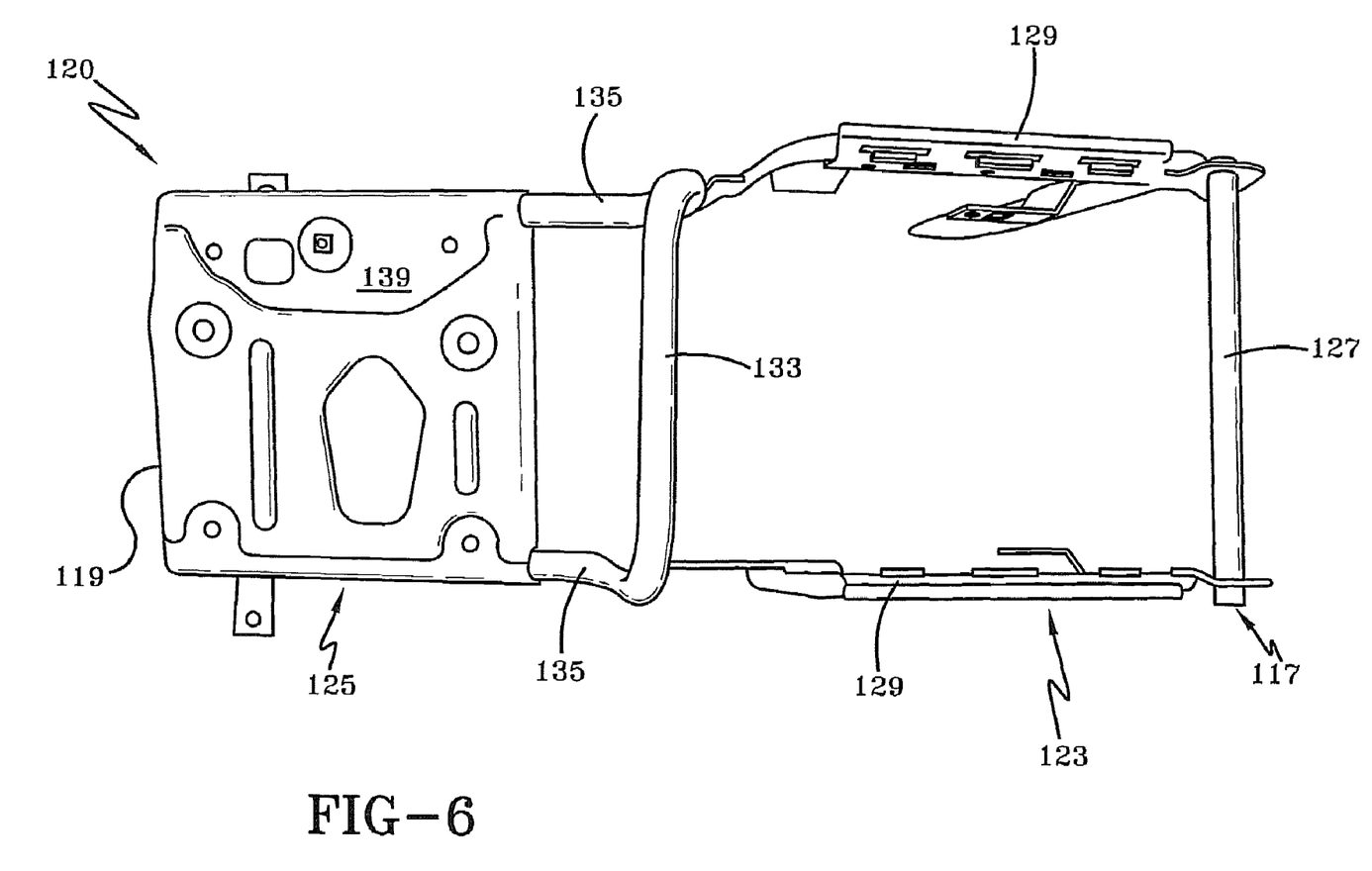
FIG. 6 is a top view of the console frame of FIG. 4.
Figure 7:
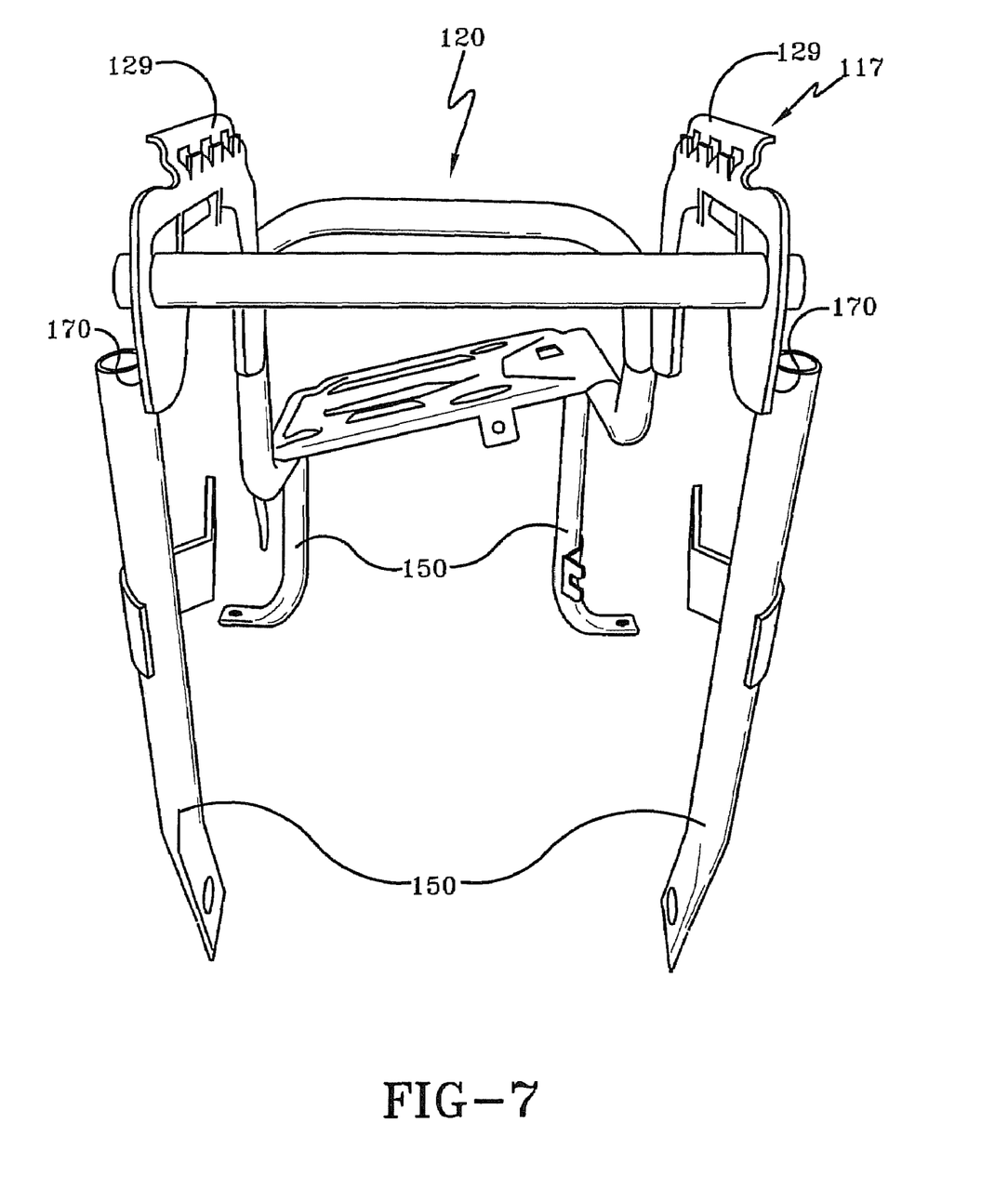
FIG. 7 is a perspective first end view of the console frame of FIG. 4.
Figure 8:
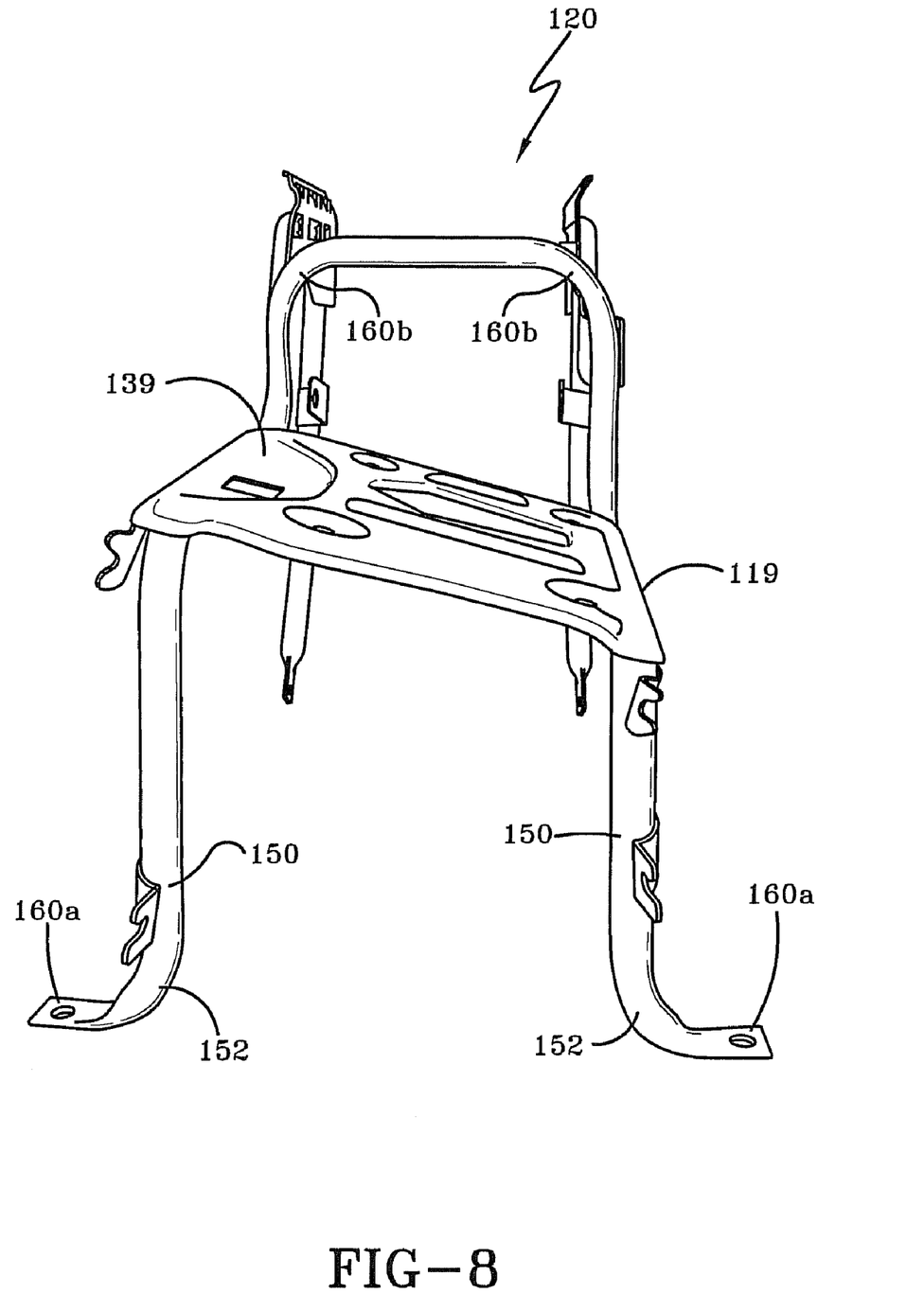
FIG. 8 is a perspective second end view of the console frame of FIG. 4.

With continuing reference to FIGS. 3-9, depending on the particular design of the console frame 120, it may be desirable to bend the one or more of the tubular members 122 prior to assembling them to form the console frame 120. The manner of bending the tubular members 122 can be any conventional method. Bends in the legs are referenced 160a and bends in the other components are shown with reference 160b. It should be understood that the number and the degree of bends can be varied to meet the needs of the particular console assembly 100 and the particular corresponding vehicle 10. In the embodiment shown, the first and second tiers 117, 119 have a periphery that is substantially rectangular in shape from a plan view, as seen best in FIG. 6. However, the particular shape of the first and second tiers 117, 119 can vary according to the needs of the console assembly 100 and may include, for example, a circular shape, an oval shape, a square shape, and any polygon shape as well. The tubular members 122 used to form the console frame 120 may be welded together such as shown, for example, at references 170, 170 in FIG. 7 where the legs 150, 150 are each welded to one of the frame brackets 129, 129. It may also be desirable to form one or more legs 150 as well as any other portion of the console frame 120 out of a single tubular member 122. This is shown in FIG. 4 where legs 175a, 175b, second cross member 133 and side members 135, 135 are formed from a single tubular member 122 which is bent into the shape shown. The particular number of welds used to attach tubular members 122 together and the particular number of bends made to the tubular members 122 can be any chosen with sound engineering judgment.

With reference now to FIGS. 3 and 9-11, the outer shell 180 can be attached to the console frame 120 in any manner chosen with sound engineering judgment and may be formed of a padded and upholstered material which can be fabric, vinyl, leather or any other material chosen with sound engineering judgment. For the embodiment shown, the outer shell 180 includes at least one panel 182 that is attached to the console frame 120 via clips 183 which are attached to the console frame 120. The particular type and number of clips 183 used can be chosen with sound engineering judgment. The outer shell 180 may include one or more side panels 182a and one or more top panels 182b. The outer shell 180 may also include any number of garnish members 185 to provide for an addition method of adjusting the ornamental design of the console assembly 100.

Figure 12:
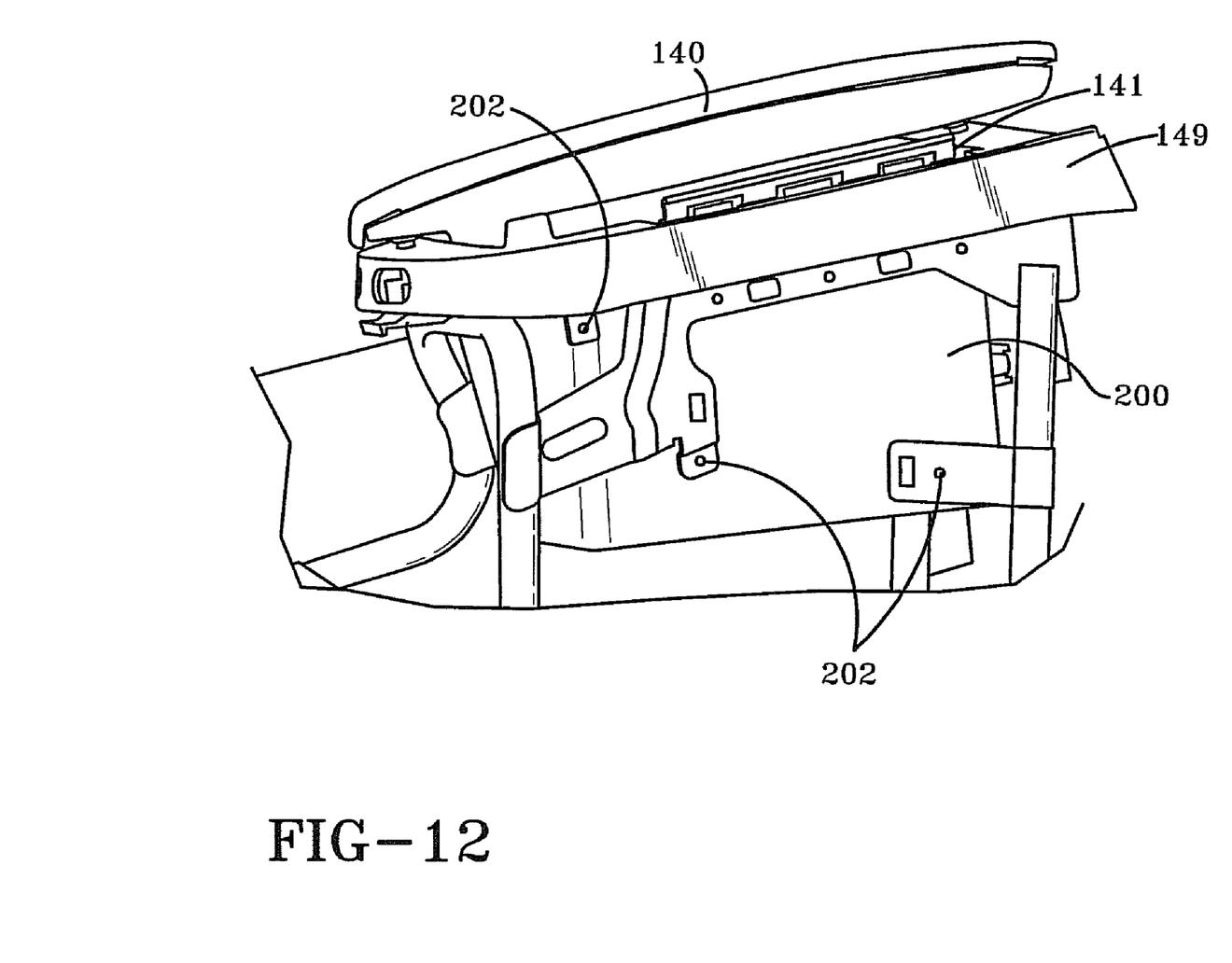
FIG. 12 is a perspective side view of the console frame in partial cut-away showing how the console container may be attached to the console frame.
Figure 13:
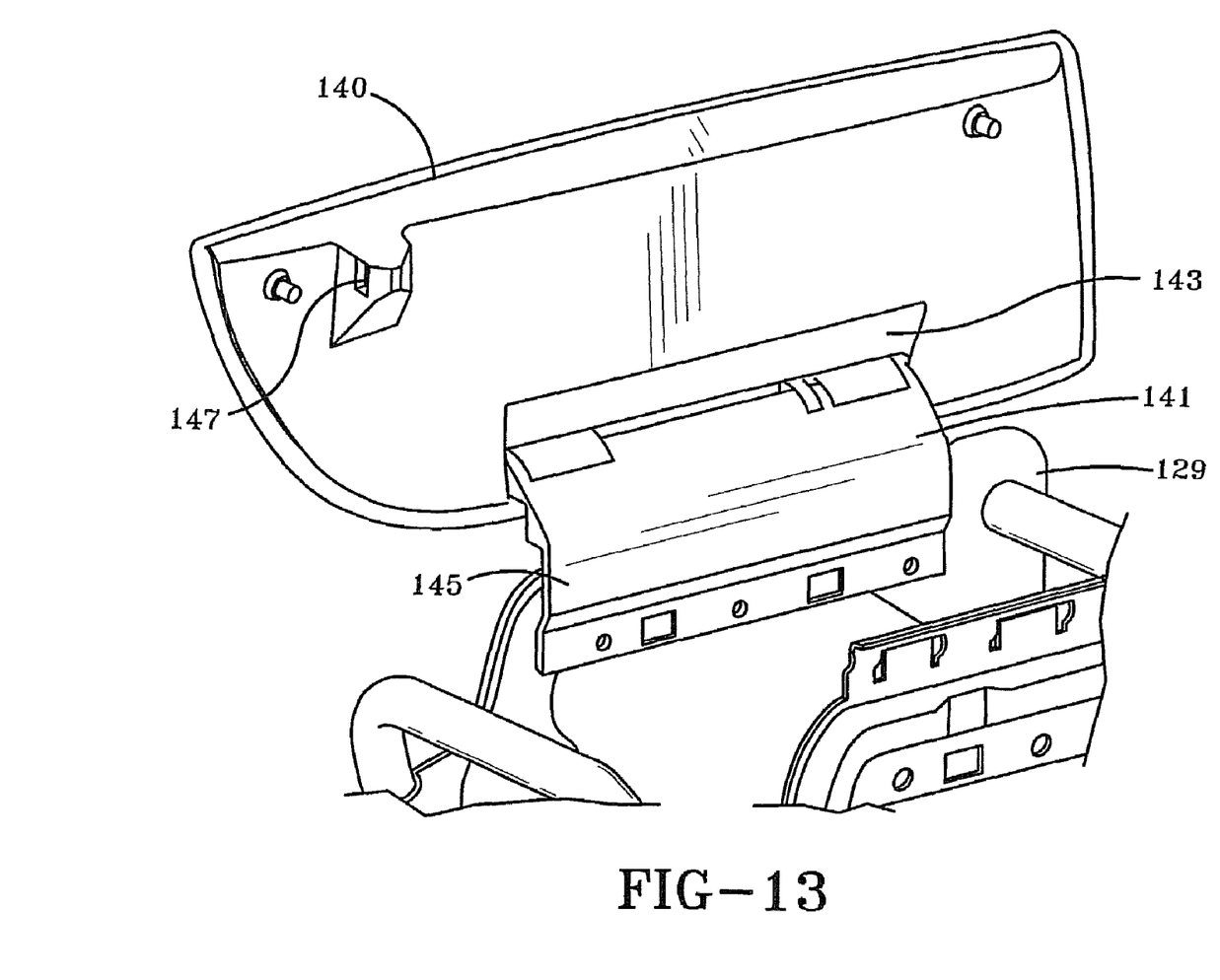
FIG. 13 is a perspective side view of the console frame in partial cut-away showing how the armrest may be attached to the console frame.
Figure 14:
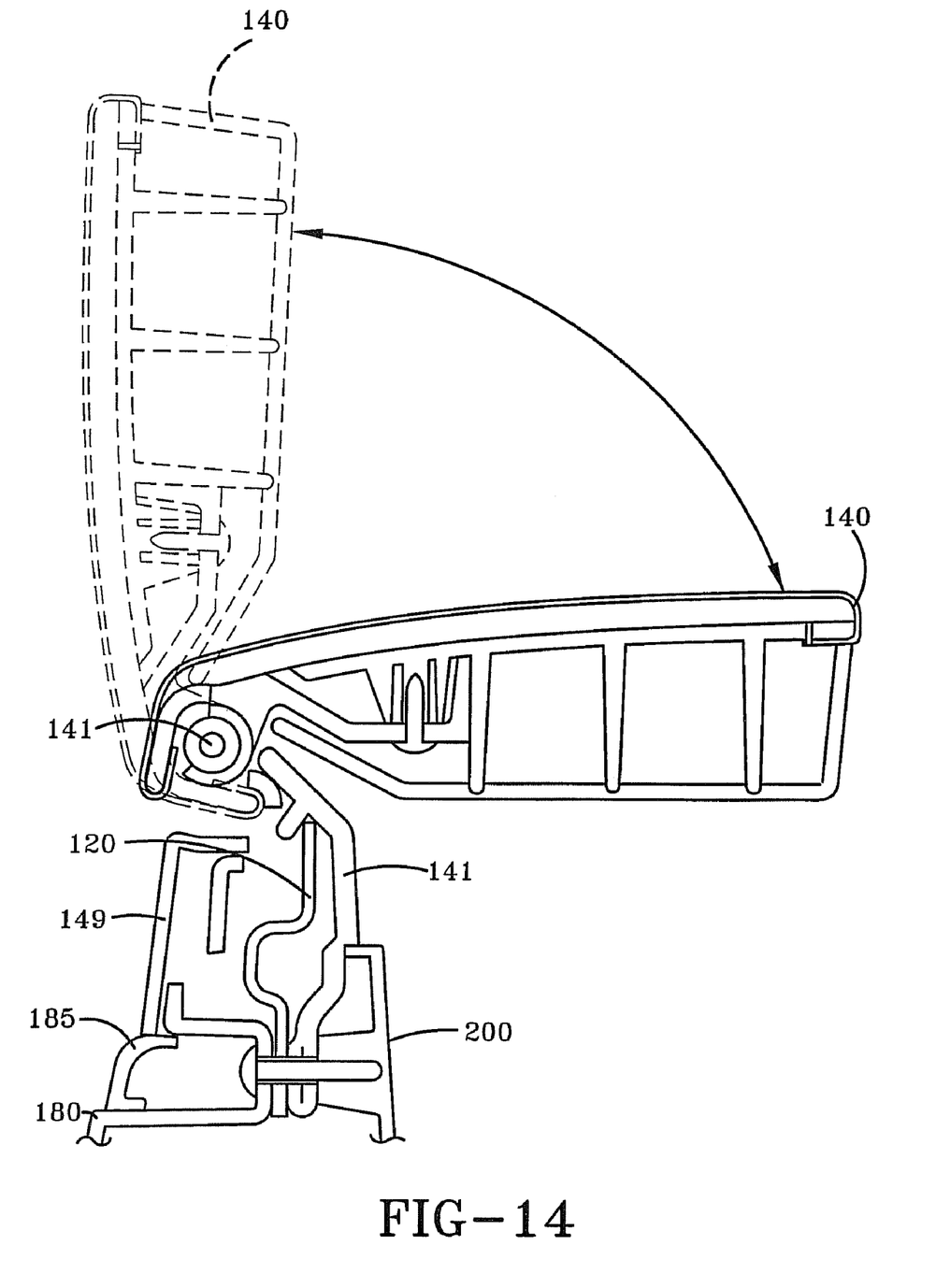
FIG. 14 is a schematic side view of the console frame showing the armrest in a closed condition and, with shaded lines, in an open condition.

With reference now to FIGS. 2-3 and 12-14, the armrest 140 is supported on the console frame 120 and is adapted to support a person's arm, hand or the like. In one embodiment, the armrest 140 is fixedly attached to the console frame 120. In another embodiment, shown, the armrest 140 is pivotally attached to the console frame 120. This attachment may be made with a hinge 141 having first member 143 that is attached to the armrest 140 in any conventional manner and a second member 145 that is attached to either of the frame brackets 129, 129 in any conventional manner. In another embodiment, a latch mechanism 147 may be used to latch the armrest 140 to a latch panel 149. In still another embodiment, a console container 200, for use in holding and storing miscellaneous items in a well known manner, may be positioned within the first segment 123 just below the first tier 117. The console container 200 may be attached to the console frame 120 with screws 202 as shown in FIG. 12. The latch panel 149, in one embodiment, may be attached to the console container 200 with screws 202 as also shown in FIG. 12. When, in one embodiment, a pivotal armrest 140 is combined with a console container 200, the armrest 140 can be pivoted "open" (as shown in FIGS. 3 and 13) so that the console container 200 can be easily accessed.

Figure 10:
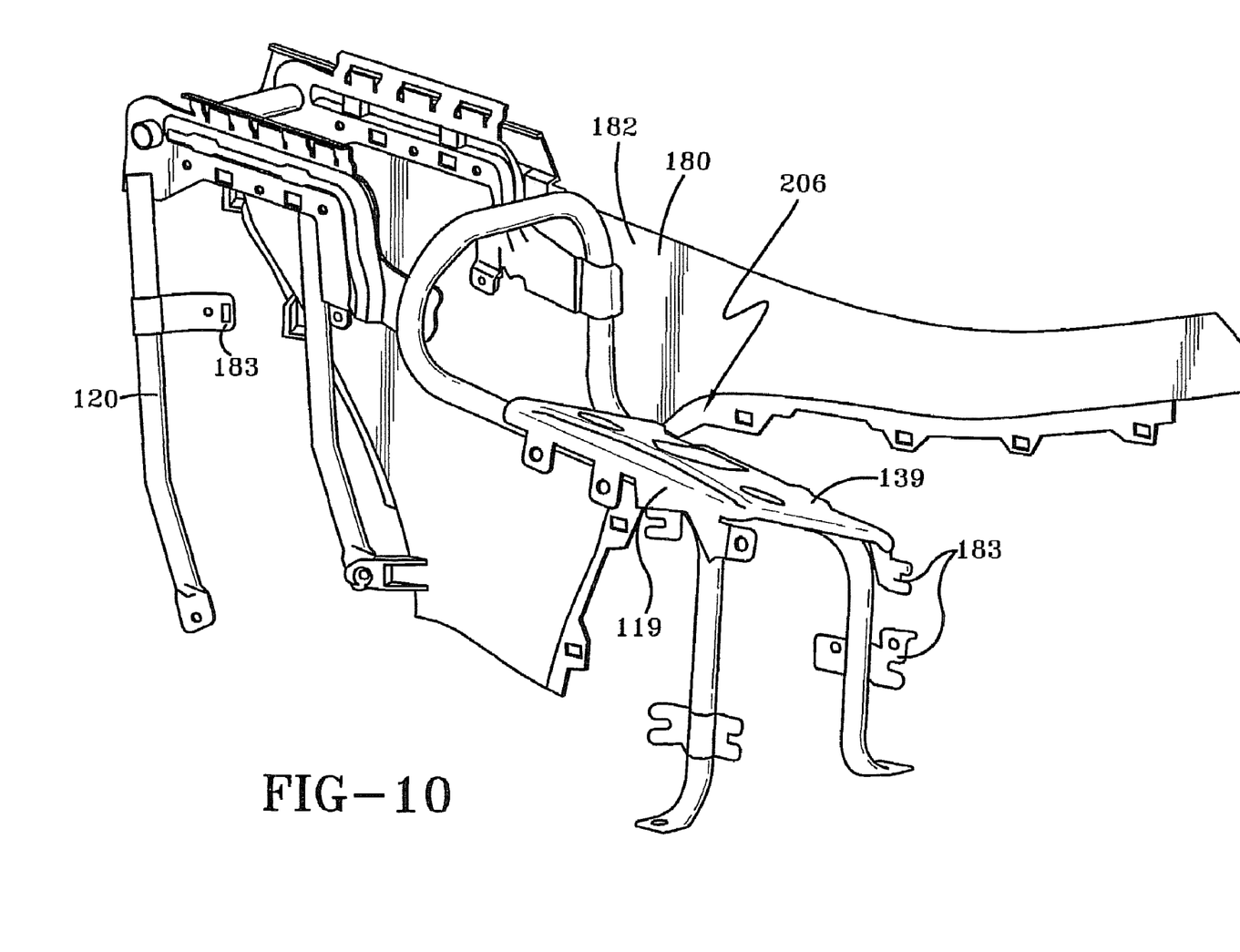
FIG. 10 is a perspective side view of the console frame in partial cut-away showing how the outer shell may be attached to the console frame.
Figure 11:
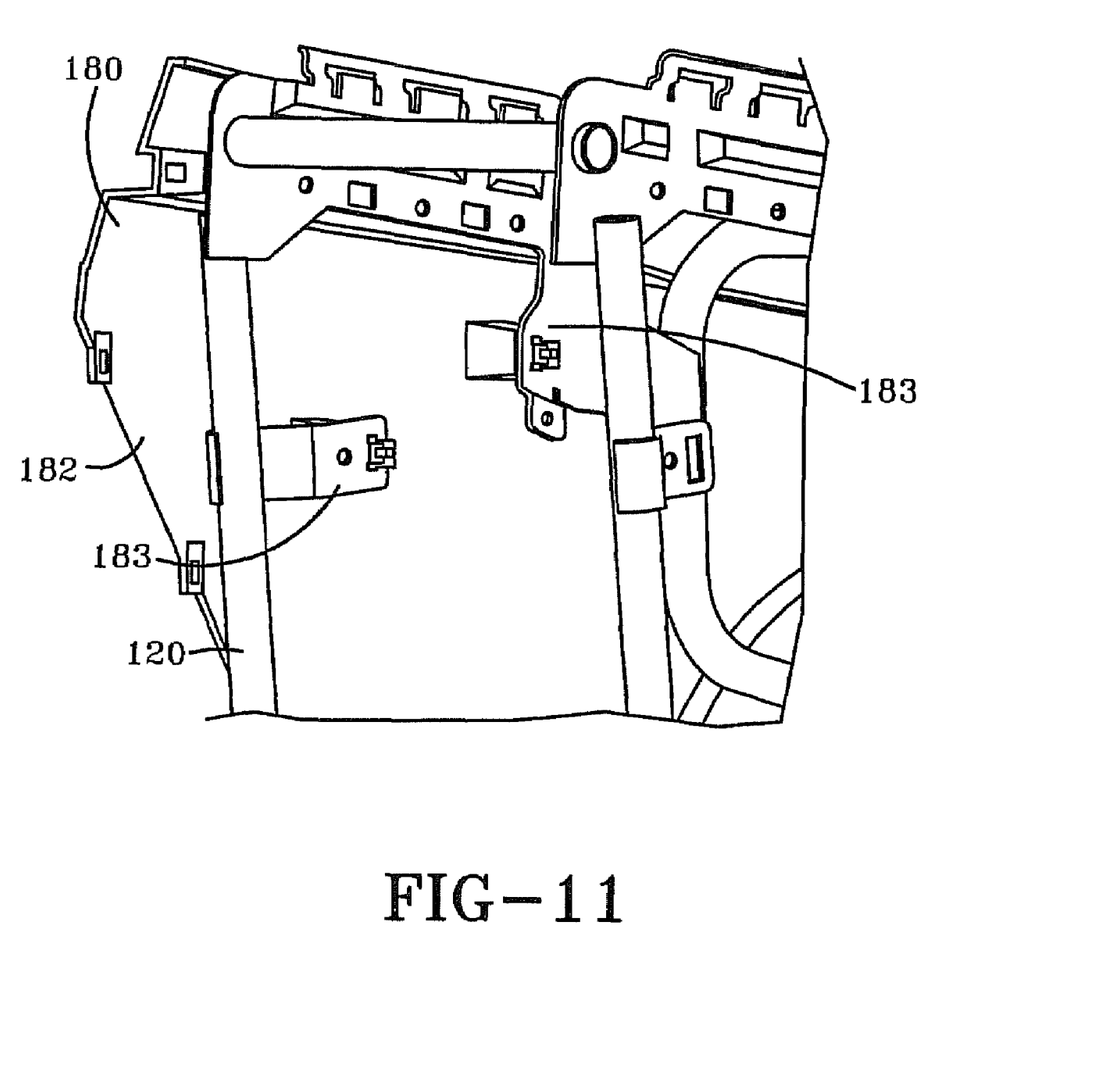
FIG. 11 is a close up view of the console frame of FIG. 10 also showing how the outer shell may be attached to the console frame.

With reference now to FIGS. 3 and 10, one or more top panels 182b may extend above the second tier 119 creating a space 206 above the plate 139 to position other vehicle or console related components. In one embodiment, for example, an electronic control unit 208 may be positioned within space 206 and supported on the plate 139. In another embodiment, a shifter 210 may extend through an opening in the plate 139, through the space 206, and through an opening in the top panel 182b for access by the vehicle operator. In yet another embodiment, a cup holder 204 may be formed in the top panel 182b, as shown. It is to be understood that the components just described are exemplary only as many other components may be positioned within the space 206 and/or on the top panel 182b.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An automobile comprising:
a vehicle frame:
a body supported on the vehicle frame and defining a passenger compartment;
a console assembly positioned within the passenger compartment, the console assembly comprising:
(A) a console frame comprising at least a first tubular portion and a plurality of legs. each leg operatively supported on the vehicle frame;
(B) an outer shell operatively connected to the console frame for use in covering the console frame; and.
(C) an armrest supported on the console frame and adapted to support a person's arm;
wherein the console frame comprises first and second sections, the first section comprising two legs and the second section comprising two legs;
wherein the two legs of the first section are formed of a single tubular member.

2. The automobile of claim 1 wherein the armrest is pivotally attached to the console frame.

3. The automobile of claim 1 further comprising a console container supported on the console frame, the console container is adapted to store miscellaneous items.

4. The automobile of claim 1 further comprising a shifter that is supported on the console frame.

5. The automobile of claim 1 further comprising an electronic control unit that is supported on the console frame.

6. The automobile of claim 1 wherein the tubular portion is substantially formed of metal.

7. The automobile of claim 1 wherein the tubular portion is substantially formed of a rigid polymeric material.

8. A console assembly adapted to be attached within the passenger compartment of an automobile having a vehicle frame, the console assembly comprising:
(A) a console frame comprising a plurality of legs, each leg is formed of a tubular portion and is operatively supported on the vehicle frame;
(B) an outer shell operatively connected to the console frame for use in covering the console flame;
(C) an armrest pivotally supported on the console frame and adapted to support a person's arm; and.
(D) a console container supported on the console frame, the console container is adapted to store miscellaneous items and is accessible through the armrest;
wherein the console frame comprises first and second segments, the first segment comprising two legs and the second segment comprising two legs, the two legs of the first segment are formed of a single tubular member, the first segment defines a first tier and the second segment defines a second tier.

9. The console assembly of claim 8 further comprising:
a latch panel supported on the console frame; and,
a latch mechanism for use in latching the armrest to the latch panel.

10. The console assembly of claim 8 further comprising a shifter that is supported on the console frame.

11. The console assembly of claim 10 wherein the console frame further comprises a plate supported by the legs, the plate having an opening that receives the shifter.

12. The console assembly of claim 8 further comprising an electronic control unit that is supported on the console frame.

13. The console assembly of claim 8 wherein the tubular portion is substantially formed of metal.

14. The console assembly of claim 8 wherein the tubular portion is substantially formed of a rigid polymeric material.

15. A console assembly adapted to be attached within the passenger compartment of an automobile having a vehicle frame, the console assembly comprising:
(A) a console frame comprising a plurality of legs, each leg is formed of a tubular portion and is operatively supported on the vehicle frame, wherein at least two legs are formed of a single tubular member;
(B) an outer shell operatively connected to the console frame for use in covering the console frame; and,
(C) a console container supported on the console frame, the console container is adapted to store miscellaneous items.

16. The console assembly of claim 15 wherein the console frame comprises:
a first segment comprising two legs; and
a second segment comprising two legs,
wherein the first segment defines a first tier and the second segment defines a second tier.

17. The console assembly of claim 15 further comprising an armrest pivotally supported on the console frame and adapted to support a person's arm, wherein the console container is accessible through the armrest.

18. The console assembly of claim 17 further comprising:
a latch panel supported on the console frame; and,
a latch mechanism for use in latching the armrest to the latch panel.

19. The console assembly of claim 15 ftirther comprising:
a shifter supported on the console frame; and,
a plate supported by the legs, the plate having an opening that receives the shifler.

20. The console assembly of claim 15 further comprising an electronic control unit that is supported on the console frame.

* * * * *